2,426,219

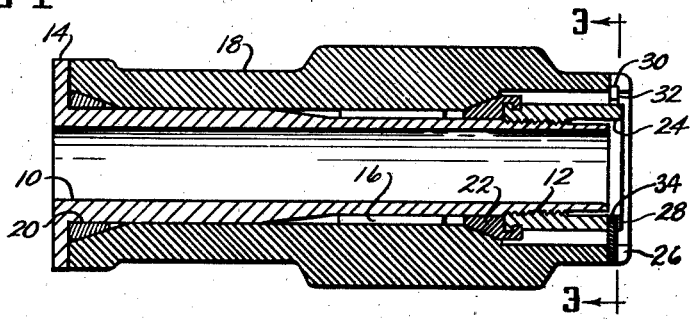
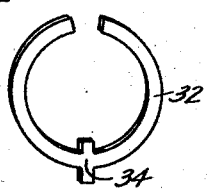
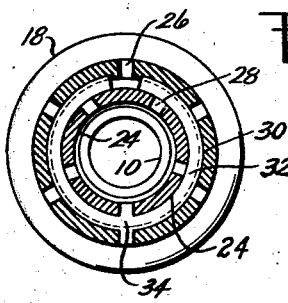
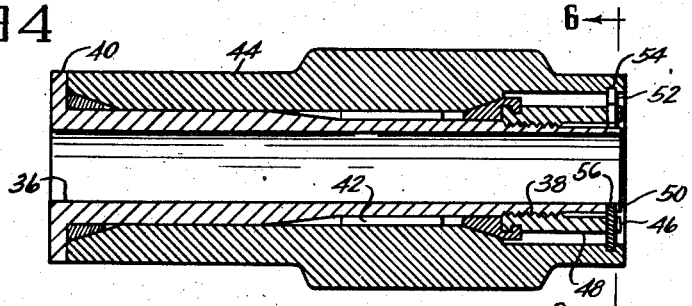
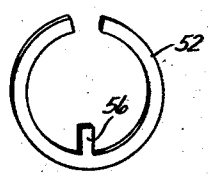
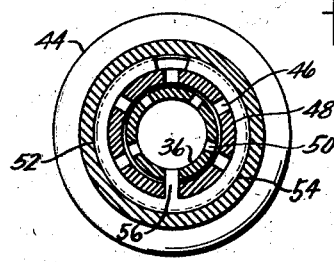
INVENTOR.
TOM C. JACKSON Patented Aug. 26, 1947

UNITED STATES PATENT OFFICE 2,426,219

LOCKING MEANS

Tom C. Jackson, Lebanon, Ky.

Original application November 18, 1943, Serial No. 510,791. Divided and this application February 10, 1945, Serial No. 577,250

6 Claims. (Cl. 287—53)

(Granted under the act of March 3, 1883, as amended April 30, 1928; 370 O. G. 757)

The invention described herein may be manufactured and used by or for the Government for governmental purposes, without the payment to me of any royalty thereon.

This invention is a division of my copending application, Serial No. 510,791, now Patent No. 2,374,207, and relates to locking means for securing two concentric cylindrical parts against relative rotation. It is particularly useful as part of the mechanism which fastens the hub of an aircraft propeller to the propeller shaft.

An object of the invention is to provide a locking device of relatively low cost which is quickly applied or removed and is positively secured against accidental displacement.

Other objects will be apparent upon consideration of the following description taken in conjunction with the drawing, wherein:

Fig. 1 is an axial section through one embodiment of the invention which includes a hub, the means which drivably fastens the hub to the shaft, and the locking means which keeps the rotatable part of the fastening means from being loosened.

Fig. 2 shows a detail part of the assembly Fig. 1.

Fig. 3 is a transverse section taken at 3—3 of Fig. 1 through the locking means.

Fig. 4 is an axial section through another application of the invention which is like Fig. 1 except that it requires a modified form of locking means.

Fig. 5 shows a detail part of the assembly Fig. 4.

Fig. 6 is a transverse section taken at 6—6 of Fig. 4 through the modified form of locking means.

Like reference characters refer to like parts throughout the drawings.

Referring more particularly to that exemplification of the invention shown in Figs. 1, 2, and 3, a hollow shaft 10 is threaded at the forward end as at 12, and at the rearward end has an outwardly extending flange 14, and intermediate the ends is provided with external splines 16 to receive the internal splines of a hub 18. Hub 18 is clamped between a rear cone 20 and a front cone 22 by the clamping nut 24, the nut being internally threaded to correspond to the external threads on the hollow shaft 10.

End notches 26 are provided in the forward end of the hub while the forward end of the nut is similarly provided with notches 28. The front cone 22 is conventional, being provided with the usual internal annular groove which is engaged by a corresponding external annular rib on the nut whereby the cone may be withdrawn from its clamping position. The interior of the hub 18 is provided with an internal annular groove 30 into which a locking ring 32 is sprung.

Locking ring 32 carries a radially extending key 34 which extends both outward and inward from the ring (see Fig. 2), the inwardly extending portion of the key passing through one of the series of notches 28 in the end of the nut and the outwardly extending portion of the key passing through one of the series of notches 26 in the end of the hub.

The split locking ring 32 is sprung into the annular groove 30 in the bore of the hub to secure it against axial displacement. Tightening of the nut clamps the hub between the rear and front cones 20 and 22 and when the nut is drawn to its final position, the ring is sprung into the internal groove with the outwardly extending portion of the key into one of the notches 26 of the hub and the inwardly extending portion into one of the other notches 28 of the nut. By making the number of notches in the end of the hub differ by one notch with the number in the end of the nut, a fine adjustment may be provided. The nut 24 is now locked against rotation with respect to the hub 18, and, since the hub and the shaft 10 are held against relative rotation by the splines 16, the nut is held against relative rotation with respect to the shaft.

The modification shown in Figs. 4, 5, and 6 is more adaptable where, for any reason, it is desirable that no notches be cut in the forward end of the hub. In this modification the hollow shaft 36 is threaded at the forward end as at 38 and carries a flange 40 at the rearward end, and intermediate the forward and rearward end is splined at 42 in the same manner as is done in the modification shown in Fig. 1. The hub 44 carries internal splines which fit the external splines 42 on the shaft. Notches 46 are provided in the forward end of the nut 48, while corresponding notches 50 are provided in the forward end of the shaft 36, no notches being provided in the forward end of the hub 44. The spring ring 52 is fitted to an internal annular groove 54 in the hub 44 but the key portion 56 extends in an inward direction only, whereby the key portion may extend both through a notch in the nut and one of the notches in the shaft. Obviously since the hub and shaft are splined together, the locking of the nut to the shaft produces a corresponding locking of the nut to the hub.

Having described several embodiments of my invention, I claim:

1. As part of a mechanical structure, a locking means which consists of an inner member with a substantially cylindrical exterior, an outer member with a substantially cylindrical interior surrounding said inner member with space between the two members, means for holding the two members against relative rotation, a tubular member in the space between the outer and inner members adapted for relative rotation with respect to the outer and inner members, said outer member and said tubular member having radially extending keyways in their ends, and said outer member having an annular groove in its cylindrical interior within the length of said keyways, a spring ring sprung into said groove, and a key extending radially outward from said ring into a selected one of the keyways in said outer member, and radially inward from said ring into a selected one of the keyways in said tubular member.

2. The structure of claim 1 wherein the inner member is a tubular shaft, the outer member is a cylindrical hub splined to said shaft, and the tubular member is a nut threadedly engaged with said shaft.

3. As part of a mechanical structure, a locking means which consists of an inner member with a substantially cylindrical exterior, an outer member with a substantially cylindrical interior surrounding said inner member with space between the two members, means for holding the two members against relative rotation, a tubular member in the space between the outer and inner members adapted for relative rotation with respect to the outer and inner members, said inner member and said tubular member having radially extending keyways in their ends, and said outer member having an annular groove in its cylindrical interior adjacent said radial keyways, a spring ring sprung into said groove, and a key extending radially inward from the inside of said ring through a selected keyway in said tubular member into a selected keyway of said inner member.

4. The structure of claim 3 wherein the inner member is a tubular shaft, the outer member is a cylindrical hub splined to said shaft, and the tubular member is a nut, threadedly engaged with said shaft.

5. In combination, a shaft member, a hub member splinedly mounted on said shaft member, the bore of said hub member being enlarged near the end to provide an annular chamber between said hub member and shaft member, a nut in said annular chamber threadedly engaging said shaft member, said nut and one of the other said members having end splines and said annular chamber having an internal annular groove near the outer end, a spring ring in said annular groove, and a radial key integral with said ring intermediate the ends of the ring lying in the end splines of the nut and other end splined member.

6. In combination, three concentric cylindrical members, two of said members being fixed against rotation with respect to each other, and the other member being rotatable with respect to the said two members, two of said members having end splines and the outer one of said members having an internal groove, a spring ring in said internal groove, and a key integral with said ring intermediate the ends of the ring lying in end splines of the two end splined members.

TOM C. JACKSON.

REFERENCES CITED

The following references are of record in the file of this patent:

UNITED STATES PATENTS

| Number | Name | Date |
|---|---|---|
| 1,809,404 | Culbertson | June 9, 1931 |